(12) United States Patent
Terrell, II

(10) Patent No.: US 8,112,675 B2
(45) Date of Patent: Feb. 7, 2012

(54) FILESYSTEM DIRECTORY DEBUG LOG

(75) Inventor: James R. Terrell, II, Charlotte, NC (US)

(73) Assignee: Nvidia Corporation, Santa Clara, CA (US)

( * ) Notice: Subject to any disclaimer, the term of this patent is extended or adjusted under 35 U.S.C. 154(b) by 959 days.

(21) Appl. No.: 11/536,104

(22) Filed: Sep. 28, 2006

(65) Prior Publication Data

US 2008/0155347 A1 Jun. 26, 2008

(51) Int. Cl.
 G06F 11/22 (2006.01)
(52) U.S. Cl. .............................. 714/45; 714/37; 714/57
(58) Field of Classification Search .................... 714/45, 714/57
See application file for complete search history.

(56) References Cited

U.S. PATENT DOCUMENTS

| | | | |
|---|---|---|---|
| 5,678,026 A | 10/1997 | Vartti et al. | |
| 5,956,712 A | 9/1999 | Bennett et al. | |
| 6,021,408 A * | 2/2000 | Ledain et al. | 707/8 |
| 6,105,049 A | 8/2000 | Govindaraju et al. | |
| 6,185,580 B1 | 2/2001 | Day, III et al. | |
| 6,230,230 B1 | 5/2001 | Joy et al. | |
| 6,496,909 B1 | 12/2002 | Schimmel | |
| 6,499,048 B1 | 12/2002 | Williams | |
| 6,895,591 B1 * | 5/2005 | Russ et al. | 719/332 |
| 6,961,739 B2 | 11/2005 | Lee et al. | |
| 7,120,762 B2 | 10/2006 | Rajwar et al. | |
| 7,206,915 B2 | 4/2007 | DeSouter et al. | |
| 7,266,555 B1 | 9/2007 | Coates et al. | |
| 7,290,105 B1 | 10/2007 | Jeter et al. | |
| 7,333,993 B2 | 2/2008 | Fair | |
| 7,340,743 B1 | 3/2008 | Anural et al. | |
| 7,409,506 B2 | 8/2008 | Kamigata et al. | |
| 2002/0065776 A1* | 5/2002 | Calder et al. | 705/51 |
| 2002/0078069 A1* | 6/2002 | Moore | 707/200 |
| 2002/0078123 A1 | 6/2002 | Latour | |
| 2002/0083463 A1* | 6/2002 | Camara | 725/110 |
| 2002/0091863 A1 | 7/2002 | Schug | |
| 2003/0120903 A1 | 6/2003 | Roussel | |
| 2003/0137680 A1* | 7/2003 | Maruoka | 358/1.13 |
| 2003/0236771 A1* | 12/2003 | Becker | 707/2 |
| 2004/0025069 A1 | 2/2004 | Gary et al. | |
| 2004/0064485 A1* | 4/2004 | Yoshida et al. | 707/201 |
| 2004/0073658 A1* | 4/2004 | Oran et al. | 709/224 |
| 2004/0083273 A1* | 4/2004 | Madison et al. | 709/217 |
| 2004/0088316 A1* | 5/2004 | Cleraux et al. | 707/102 |
| 2005/0038923 A1* | 2/2005 | Kamataki | 710/5 |
| 2005/0050043 A1* | 3/2005 | Pyhalammi et al. | 707/6 |
| 2005/0198060 A1* | 9/2005 | Imaki et al. | 707/102 |
| 2005/0273701 A1* | 12/2005 | Emerson et al. | 715/513 |
| 2006/0117316 A1 | 6/2006 | Cismas et al. | |

(Continued)

OTHER PUBLICATIONS

Wang et al., "Virtual Log Based File Systems for a Programmable Disk", Proceedings of the Third Symposium on Operating Systems Design and Implementation. Feb. 1999.*

*Primary Examiner* — Scott Baderman
*Assistant Examiner* — Chae Ko

(57) ABSTRACT

A system for handling debug log messages in a computerized device under test that has a filesystem and a communications link. A virtual debug folder provides one or more virtual folders wherein the debug log messages are stored as synthesized filenames. The virtual folders are then viewable via the communications link as if actual folders of the filesystem and the synthesized filenames are viewable via the communications link as if actual filenames of the filesystem.

23 Claims, 2 Drawing Sheets

U.S. PATENT DOCUMENTS

| | | |
|---|---|---|
| 2006/0143154 A1* | 6/2006 | Jager ................................. 707/1 |
| 2007/0005603 A1* | 1/2007 | Jain et al. ......................... 707/10 |
| 2007/0005740 A1 | 1/2007 | DiFalco et al. |
| 2007/0005741 A1 | 1/2007 | Hwang et al. |
| 2007/0050727 A1* | 3/2007 | Lewis-Bowen et al. ...... 715/779 |
| 2007/0055692 A1 | 3/2007 | Pizzo et al. |
| 2007/0079100 A1 | 4/2007 | Shiga et al. |
| 2007/0118819 A1* | 5/2007 | Basin et al. ................... 715/847 |
| 2007/0128899 A1* | 6/2007 | Mayer ........................... 439/152 |
| 2007/0192715 A1* | 8/2007 | Kataria et al. ................ 715/764 |
| 2007/0266289 A1* | 11/2007 | Yang ............................. 714/742 |
| 2008/0033969 A1* | 2/2008 | Koo et al. ..................... 707/100 |

* cited by examiner

```
Volume in drive V has no label.
Volume Serial Number is 149D-31F5

Directory of V:\DEBUG       ← 36

Last Modified
02/20/2004  05:50 PM    <DIR>          .
02/20/2004  05:50 PM    <DIR>          ..
                                                      ┌─ 34
                                     Size  Name
01/01/2006  12:01:00.000 AM    0    " (0001) Mem, 0x9806,                                    820,          894612,    890908"
01/01/2006  12:01:00.061 AM    0    " (0002) Mem, 0x100c,                                    612,          894804,    891892"
01/01/2006  12:01:00.065 AM    0    " (0003) Mem, 0x9806,                                    836,          894300,    890140"
01/01/2006  12:01:00.099 AM    0    " (0004) Mem, 0x100c,                                    568,          894564,    891580"
01/01/2006  12:01:00.345 AM    0    " (0005) Mem, 0x9806,                                    828,          894068,    890396"
01/01/2006  12:01:01.234 AM    0    " (0006) Mem, 0x100c,                                    608,          894288,    891236"
01/01/2006  12:01:01.010 AM    0    " (0007) Mem, 0x9806,                                    844,          893776,    889484"
01/01/2006  12:01:01.020 AM    0    " (0008) Removed heap recycler 0014fe48:10c242e0."
01/01/2006  12:01:01.030 AM    0    " (0009) Installed heap recycler 0014fe48:10c1ff40."
01/01/2006  12:01:01.040 AM    0    " (0010) Removed heap recycler 0014fe48:10c1ff40."
01/01/2006  12:01:01.050 AM    0    " (0011) Installed heap recycler 0014fe48:10c1feb0."
01/01/2006  12:01:01.060 AM    0    " (0012) Mem, 0x1007,                                   2724,          917340,    891628"
01/01/2006  12:01:02.120 AM    0    " (0013) Mem, 0x1007,                                   5316,          913856,    895368"
01/01/2006  12:01:02.130 AM    0    " (0014) Mem, 0x1007,                                  10924,          902924,    895368"
01/01/2006  12:01:02.140 AM    0    " (0015) Mem, 0x1007,                                   5408,          897516,    895368"
01/01/2006  12:01:02.150 AM    0    " (0016) Removed heap recycler 0014fe48:10c1feb0."
01/01/2006  12:01:02.160 AM    0    " (0017) Installed heap recycler 0014fe48:10c13950."
01/01/2006  12:01:02.230 AM    0    " (0018) Removed heap recycler 0014fe48:10c13950."
01/01/2006  12:01:02.350 AM    0    " (0019) Installed heap recycler 0014fe48:10c13950."
01/01/2006  12:01:02.370 AM    0    " (0020) Mem, 0x1007,                                   2268,          919616,    903292"
01/01/2006  12:01:02.380 AM    0    " (0021) Mem, 0x100c,                                    596,          919020,    903292"
```

FIG. 2

FILESYSTEM DIRECTORY DEBUG LOG

TECHNICAL FIELD

The present invention relates generally to error detection/correction and fault detection/recovery in computerized systems, and more particularly to means or steps for recording output from the system under test or diagnosis.

BACKGROUND ART

Dedicated debugging interfaces are widely used to log status and error messages from a running computerized system. Unfortunately, these interfaces often require specialized hardware that is expensive and difficult to use. Sometimes the debugging interface, such as the Joint Test Action Group (JTAG) interface, for example, may require its own dedicated hardware bus which has to be physically exposed outside of the system being tested or debugged. This is frequently awkward and, especially on production systems, these specialized interfaces may not be made accessible because of cost, mechanical, or security considerations.

One common solution to this problem is to log messages using another general-purpose communications bus or storage mechanism that exists on the system under test. For example, messages may be logged to a general-purpose bus (e.g., a serial port) or to a file stored on a hard disk drive. One disadvantage of this, however, is that the debugging messages may interfere with the normal purpose of the bus or storage device, especially if those mechanisms are also under test. For example, storing the debug messages in a file on a storage device might change the behavior of the native file system, by filling up storage space or by adding directory and file entries. If the file system is the module which is being tested, this might then interfere with reproduction of defects or change performance metrics. It might also be difficult to access the logged messages while the bus or storage device is under test. Instead, the messages may have to be read out after testing has been completed, thus losing any real-time logging capability.

Accordingly, what is needed is a less invasive and more real-time mechanism for exporting debugging messages on computerized systems that maintain externally accessible file system structures.

DISCLOSURE OF INVENTION

Accordingly, it is an object of the present invention to provide a debug logging mechanism for computerized systems that is embodied as a file system directory for external access.

Briefly, one preferred embodiment of the present invention is a system for handling debug log messages in a computerized device under test having a filesystem and a communications link. A virtual debug folder provides one or more virtual folders to store the debug log messages as synthesized filenames. The virtual folders are then viewable via the communications link as if they are actual folders of the filesystem and the synthesized filenames are viewable via the communications link as if they are actual filenames of the filesystem.

Briefly, another preferred embodiment of the present invention is a method for making debug log messages in a computerized device under test having a filesystem viewable via a communications link. One or more virtual folders are provide, wherein the virtual folders are viewable via the communications link as if they are actual folders of the filesystem. Synthesized filenames are then created in the virtual folders based on the debug log messages, and they also are viewable via the communications link as if actual filenames of the filesystem.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIG. 2 is a listing of synthesized filenames in a virtual folder, that is, an exemplary view of a virtual debug folder as "seen" by a host system.

In the various figures of the drawings, like references are used to denote like or similar elements or steps.

BEST MODE FOR CARRYING OUT THE INVENTION

Figure 1:
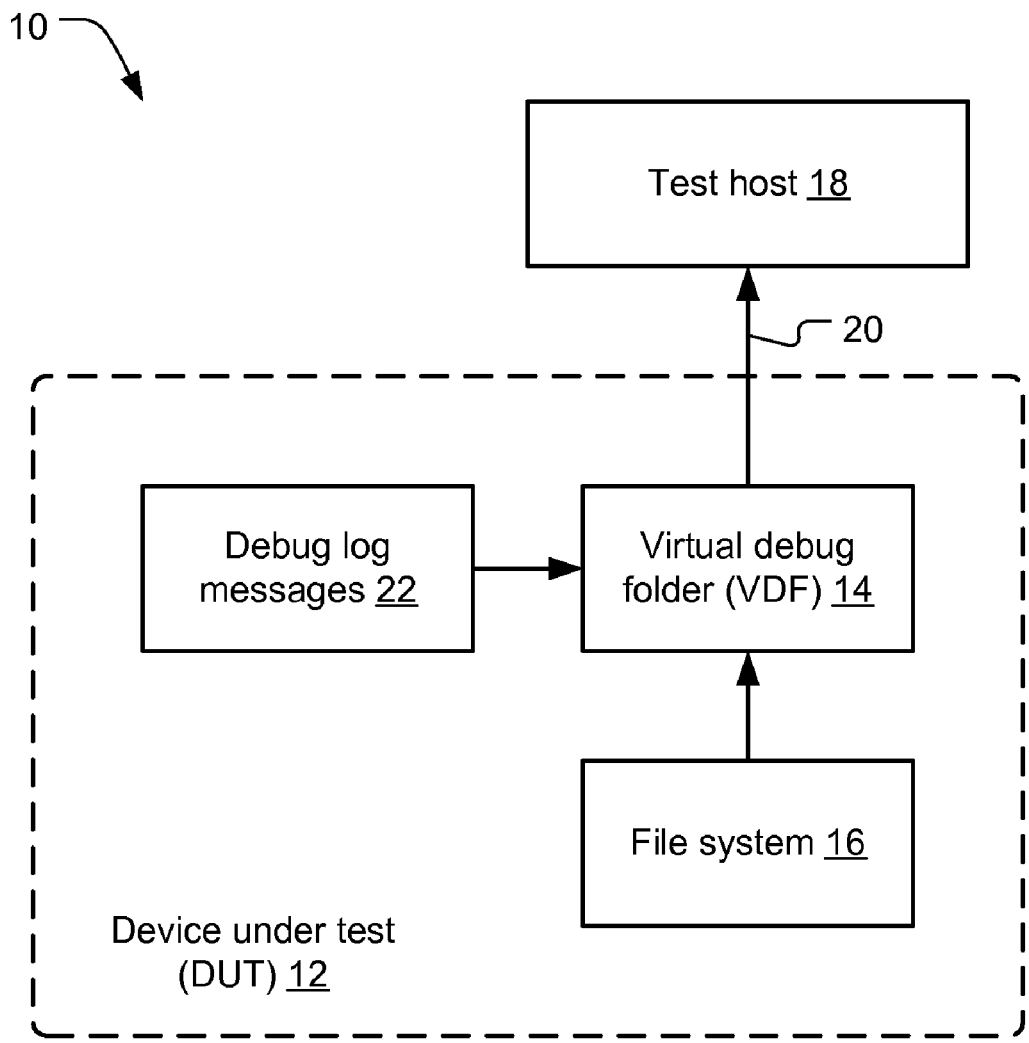
FIG. 1 is a block diagram schematically showing an embodiment of a debug log system that is in accord with the present invention.

A preferred embodiment of the present invention is a debug log embodied as a file system directory. As illustrated in the various drawings herein, and particularly in the view of FIG. 1, preferred embodiments of the invention are depicted by the general reference character 10.

FIG. 1 is a block diagram schematically showing an embodiment of a debug log system 10 that is in accord with the present invention. The debug log system 10 works with a computerized device under test (DUT 12) that contains a virtual debug folder (VDF 14) which is interposed between a filesystem 16 in the DUT 12 and an external host 18 that is accessing the filesystem 16 over a communications link 20. The VDF 14 creates virtual views of one or more virtual folders containing filenames synthesized from debug log messages 22.

FIG. 2 is a listing 32 of synthesized filenames 34 a virtual folder 36, i.e., an exemplary view of the VDF 14 as "seen" by the host 18. The virtual folders 36 and synthesized filenames 34 created by the VDF 14 do not actually exist in the storage media of the filesystem 16, thus minimizing impact on the DUT 12.

The underlying filesystem 16 that is the basis of the virtualization by the VDF 14 should support filenames of significant length and richness in order to expose the debug log messages 22 efficiently. Also, some escaping of the debug log messages 22 may have to be done in order to accommodate restrictions placed on name composition by the filesystem 16. For example, many filesystems today reserve some characters for special uses. If such characters are valid in the debug log messages 22, they can be translated to other characters or character strings that are valid. For instance, the reserved colon character (":") can be replaced with "&58;" where the number 58 is the decimal value for the colon character in ASCII (i.e., this can be done much like some special characters are represented in HTML).

Although a VDF 14 can be created using any communications channel, one simple approach is to extend an existing remote file system protocol. Some example protocols for this include the Network Filesystem (NFS) or Server Message Block (SMB) networked file system protocols, or the Picture Transport Protocol (PTP) USB object storage and transfer protocol. Since protocols like these already have to virtualize a native filesystem for presentation to a remote file system client, creating additional virtual file system resources is straightforward and is likely to be non-intrusive and to minimally add protocol overhead.

Since the message order of the debug log messages 22 should be preserved in the virtual folder 36 (or folders) of the VDF 14, even when the host 18 applies a filename sort, the VDF 14 may prepend a log line number or other serialized value that will cause the sorted synthesized filenames 34 to be presented in debug log order. The date and time fields of the synthesized filenames 34 can also be mapped to debug log order, or to timing information contained within the debug log, so that timing information for each debug log message 22 may be determined by looking at the date and time fields of the synthesized filenames 34.

Given the amount of debugging log information that can be generated by a DUT 12, the debug log messages 22 can be distributed into many virtual folders 36 in the VDF 14, instead of just a single one. This grouping can accommodate filesystems 16 that perform poorly with large numbers of files in a single folder, and may also be used to group the debug log messages 22 by message type, time, or another attribute.

The VDF 14 can easily also implement a mechanism whereby the host 18 can completely or partially clear the device debug log, by deleting the virtual folder 36 (or folders) in the VDF 14, or by deleting individual synthesized filenames 34 (single debug messages) using normal operations of the filesystem 16.

Given the sensitivity surrounding debug messages, especially on DUTs 12 that may be shipped computerized systems already in customer hands, the VDF 14 may optionally implement encryption of the debug log messages 22, again using a display/output format that is suitable for the underlying filesystem 16. Also, a mechanism controlled by the host 18 for enabling the VDF 14 can be employed so that debug logging messages are not visible unless the host 18 has first triggered the VDF 14 by performing an enable sequence of operations in the filesystem 16. For example, by creating a virtual folder 36 named "DEBUG" in the target DUT 12. Alternately, particular attributes supported by the underlying filesystem 16, such as "HIDDEN" or "SYSTEM," for instance, can be applied so that only sophisticated users could access the debug log messages 22.

While various embodiments have been described above, it should be understood that they have been presented by way of example only, and that the breadth and scope of the invention should not be limited by any of the above described exemplary embodiments, but should instead be defined only in accordance with the following claims and their equivalents.

The invention claimed is:

1. A system comprising:
a virtual debug folder operable to provide at least one virtual folder, wherein said at least one virtual folder is operable to store a plurality of debug messages as a plurality of synthesized filenames, wherein each synthesized filename of said plurality of synthesized filenames corresponds to a respective debug message of said plurality of debug messages, wherein said at least one virtual folder is viewable via a communications link as at least one actual folder of a filesystem, and wherein said plurality of synthesized filenames are viewable via the communications link as a plurality of actual filenames of the filesystem.

2. The system of claim 1, wherein said virtual debug folder is controllable via the communications link to perform at least one folder-level operation on said at least one virtual folder equivalent to at least one folder-level operation of the filesystem, and wherein said virtual debug folder is further controllable to perform at least one file-level operation on said plurality of synthesized filenames equivalent to at least one file-level operation of the filesystem.

3. The system of claim 1, wherein said virtual debug folder is operable to escape the plurality of debug messages to accommodate restrictions placed on name composition by the filesystem.

4. The system of claim 1, wherein said virtual debug folder is operable to prepend a serialized value to said plurality of synthesized filenames to order said plurality of synthesized filenames.

5. The system of claim 1, wherein said virtual debug folder is operable to map said plurality of synthesized filenames to an order based on a preset criteria.

6. The system of claim 5, wherein said preset criteria is associated with an order of receipt of said plurality of debug messages by said virtual debug folder.

7. The system of claim 1, wherein said virtual debug folder is operable to set fields in said plurality of synthesized filenames to values based on a preset criteria.

8. The system of claim 7, wherein said preset criteria is associated with an order of receipt of said plurality of debug messages by said virtual debug folder.

9. The system of claim 1, wherein said virtual debug folder is operable to organize said plurality of synthesized filenames in said plurality of virtual folders based on a preset criteria.

10. The system of claim 1, wherein said virtual debug folder is operable to encrypt said plurality of synthesized filenames.

11. The system of claim 1, wherein said virtual debug folder is operable to be selectively commanded via the communications link to show said plurality of synthesized filenames.

12. The system of claim 1, wherein said plurality of debug messages are associated with a device under test.

13. A method of presenting a plurality of debug messages, the method comprising:
providing at least one virtual folder, wherein said at least one virtual folder is viewable via a communications link as at least one actual folder of a filesystem; and
creating a plurality of synthesized filenames in said at least one virtual folder based on the plurality of debug messages, wherein each synthesized filename of said plurality of synthesized filenames corresponds to a respective debug message of said plurality of debug messages, wherein said plurality of synthesized filenames are viewable via the communications link as a plurality of actual filenames of the filesystem.

14. The method of claim 13 further comprising:
performing at least one folder-level operation on said at least one virtual folder equivalent to at least one folder-level operation of the filesystem; and
performing at least one file-level operation on said plurality of synthesized filenames equivalent to at least one file-level operation of the filesystem.

15. The method of claim 13 further comprising:
escaping the plurality of debug messages to accommodate restrictions placed on name composition by the filesystem.

16. The method of claim 13 further comprising:
prepending a serialized value to said plurality of synthesized filenames to order said plurality of synthesized filenames.

17. The method of claim 13 further comprising:
mapping said plurality of synthesized filenames to an order based on a preset criteria.

18. The method of claim 17, wherein said preset criteria is associated with an order of receipt of the plurality of debug messages.

19. The method of claim 13, wherein said creating said plurality of synthesized filenames further comprises creating said plurality of synthesized filenames in said at least one virtual folder based on a preset criteria.

20. The method of claim 13 further comprising:
encrypting said plurality of synthesized filenames.

21. The method of claim 13 further comprising:
making said plurality of synthesized filenames viewable based on at least one command via the communications link.

22. The method of claim 13 further comprising:
setting fields in said plurality of synthesized filenames to values based on a preset criteria.

23. The method of claim 22, wherein said preset criteria is associated with an order of receipt of said plurality of debug messages.

* * * * *